United States Patent [19]
Murai et al.

[11] Patent Number: 5,765,044
[45] Date of Patent: Jun. 9, 1998

[54] AIRBORNE PHOTOGRAPHING APPARATUS

[75] Inventors: Shunji Murai, Tokyo; Yoshitaka Matsumoto, Kanagawa, both of Japan

[73] Assignee: Core Corp., Tokyo, Japan

[21] Appl. No.: 652,548

[22] PCT Filed: Dec. 13, 1994

[86] PCT No.: PCT/JP94/02086

§ 371 Date: Aug. 14, 1996

§ 102(e) Date: Aug. 14, 1996

[87] PCT Pub. No.: WO95/16895

PCT Pub. Date: Jun. 22, 1995

[30] Foreign Application Priority Data

Dec. 13, 1993 [JP] Japan .................... 5-341886

[51] Int. Cl.$^6$ .................................................. G03B 39/00
[52] U.S. Cl. ...................... 396/13; 348/145; 364/420
[58] Field of Search ..................... 396/7–13; 348/144, 348/145; 364/420

[56] References Cited

U.S. PATENT DOCUMENTS 5,596,494  1/1997  Kuo .......................... 364/420

*Primary Examiner*—David M. Gray
*Attorney, Agent, or Firm*—Jones, Tullar & Cooper, P.C.

[57] ABSTRACT

An apparatus for photographing the ground continuously from an airplane, and for recording the photographed images in digital form in real time. A three-line sensor camera comprising a forward-oblique line sensor, a vertical line sensor and a backward-oblique line sensor is on board. The three-line sensor camera has a gyro integrally connected thereto. Data of the camera's attitude available from the gyro, digital data of the land images available from the camera and data of the airplane's position available from an airborne GPS are recorded and reproduced. The camera is controlled with the aid of the gyro so that its optical axis may be held in a vertical direction at all times.

1 Claim, 6 Drawing Sheets

AIRBORNE PHOTOGRAPHING APPARATUS

BACKGROUND OF THE INVENTION

1. Field of the Invention

The present invention relates to an airborne apparatus for photographing a selected piece of ground surface to provide data of ground image for determining the shape and height of the land.

2. Description of the Prior Art

Air photographs have been widely used for determining the shape and height of a selected piece of land. In general, air photographs are taken of overlapping area sections of a selected piece of land, thereby providing a series of latent images taken at regular intervals on a film. The film is developed, and the developed images are printed.

Alternatively, an airborne scanner-and-line sensor is used to provide required land images in the form of digital data.

Each of the series of the so taken pictures, however, is made up by the collection of image fractions recorded by beams of light reflected in different directions, and therefore such collection of image fractions is not continuous. In addition to this problem the image quality varies with the photosensitivity of the film, developing and printing conditions and other factors.

Nobody can tell what image is like before developing, and therefore, if pictures are found to be defective or useless after developing, the same pictures have to be taken again.

To determine the shape and height of a selected piece of land from air photographs three coordinate points $X_0$, $Y_0$ and $Z_0$ of the instantaneous position of the airborne camera and three inclinations about three coordinate axes $\omega$, $\phi$ and u must be determined analytically by using known points (reference points) in the coordinate system. A lot of work is required for finding the reference points in the coordinate system.

To automatize such air photographing-and-analyzing work it is necessary to have an analogue-to-digital conversion occur for the developed film for digitization.

The present invention aimes at photographing continuously a selected piece of land by an airborne three-line sensor camera, and at making a record the land image data in the form of digital data directly from the so taken air photographs. Also, the present invention aimes at effecting feedback control of the attitude of the airborne camera by using attitude data provided by a gyro associated with the three-line sensor camera, thereby setting the camera so that its optical axis may be vertical at all times, thus assuring that distortion-free images may be provided. Finally, the present invention aimes at making a record of each of the attitude data provided by the gyro and the instantaneous position data provided by a GPS in addition to the record of land image data recorded in the form of digital data, thereby permitting a required correction to be made later by using appropriate softwares.

SUMMARY OF THE INVENTION

An airborne photographing apparatus according to the present invention comprises: an airborne three-line sensor camera for taking pictures of a selected piece of land in three directions, that is, forward obliquely, vertically and backward obliquely; a gyro mounted in the housing of the three-line sensor camera for determining the attitude of the camera while photographing; a GPS for providing the instantaneous position data of the camera in the three-dimensional space; a stabilizer for controlling the attitude of the camera to set its optical axis to be vertical at all times, and at the same time for absorbing the vibration of the aeroplane; a data processing unit for processing the attitude data from the gyro and the position data from the GPS and outputting signals for controlling the stabilizer; a data recorder for recording the land image data from the camera, the attitude data from the gyro and the position data from the GPS; an image display for showing the land image data from the camera; and a data analyzer for converting the land image data from the camera into the land image data given in terms of fixed coordinates on the basis of the land image data, attitude data and position data all recorded by the data recorder, and for outputting the so converted land image data.

The airborne three-line sensor camera is used in taking pictures of a selected piece of land.

The gyro is mounted in the housing of the three-line sensor camera, and is used in providing data of the attitude of the camera while photographing.

The GPS is used in determining the instantaneous position data of the camera while photographing in the three-dimensional space.

The stabilizer functions to control the attitude of the camera to set its optical axis to be vertical at all times, and at the same time, absorb the vibration of the aeroplane.

The data processing unit is used in processing the attitude data from the gyro and the position data from the GPS and outputting signals for controlling the stabilizer.

The data recorder is used in recording the land image data from the camera, the attitude data from the gyro and the position data from the GPS all together.

The image display is used in showing the land image data from the camera.

The data analyzer is used in converting the land image data from the camera into the land image data given in terms of fixed coordinates on the basis of the land image data, attitude data and position data all recorded by the data recorder, and for outputting the so converted land image data.

With this arrangement the instantaneous position of the three-line sensor camera ($X_0$, $Y_0$ and $Z_0$) and the inclinations of the camera about three coordinate axes ($\omega$, $\phi$ and u) can be determined for each minute time, that is, as a function of time, thus making the reference point-finding work unnecessary, or reducing such work to a possible minimum. Also, the stereomatching can be performed by using a computer. These can provide technical innovations.

The conventional stereomatching determines a three dimensional coordinate on a selected piece of land by determining the crossing of two beams of light projected at different angles. In contrast, the three-line sensor system adopted by the present invention uses three different beams of light projected vertically, forward-obliquely and backward-obliquely respectively, and therefore, it has enough redundancy to permit a required error checking, and accordingly the accuracy with which the shape and height of a piece of land can be determined is improved.

BRIEF DESCRIPTION OF THE DRAWING

Other objects and advantages of the present invention may be understood from the following description of a preferred embodiment which is shown in the accompanying drawings.

DETAILED DESCRIPTION OF THE PREFERRED EMBODIMENT

Figure 1:
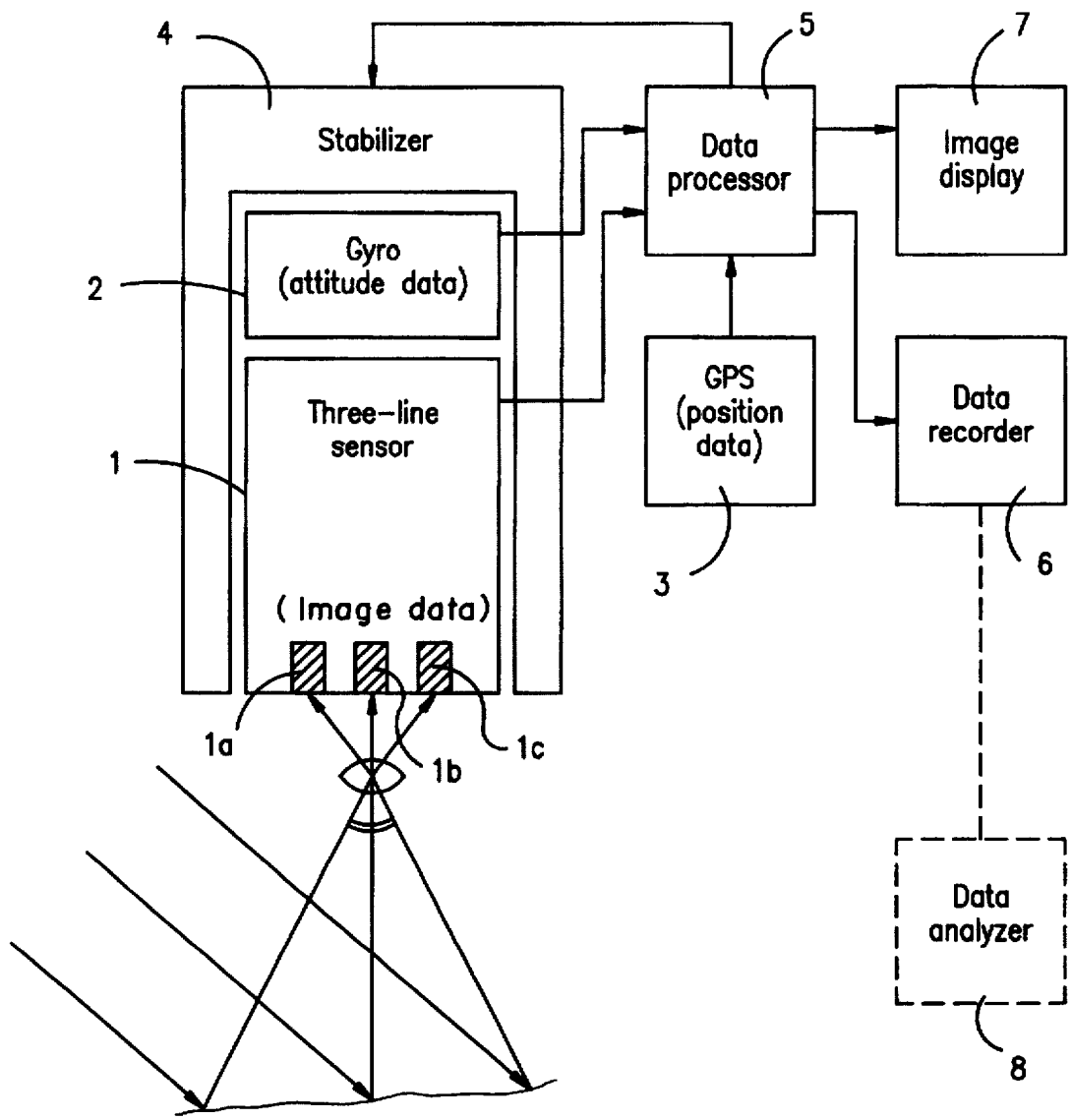
FIG. 1 is a block diagram of an airborne photographing apparatus according to one embodiment of the present invention.

Referring to the accompanying drawings, an airborne photographing apparatus according to one embodiment of the present invention is described as follows. Referring particularly to FIG. 1, the apparatus uses a three-line sensor camera 1, which comprises three CCD line sensors 1a, 1b and 1c arranged in parallel, each taking a picture of a selected piece of land at a different angle, and analogue-to-digital converting the so taken land images for sending the digital land image data to an associated data processing unit 5.

A gyro 2 is fixed to the housing of the three-line sensor camera 1, thus determining the attitude of the camera in terms of the inclinations about three coordinate axes (roll angle $\omega$, pitch angle $\phi$ and yaw angle u).

A global positioning system (abbreviated as "GPS") 3 is responsive to electromagnetic waves from selected artificial satellites for determining the instantaneous position of the receiving object (airplane or ship) in the three dimensional space.

In the present invention an airborne GPS is used for determining the instantaneous position of the three-line sensor camera 1 ($X_0$, $Y_0$, $Z_0$) while photographing in the three-dimensional space.

Figure 2:
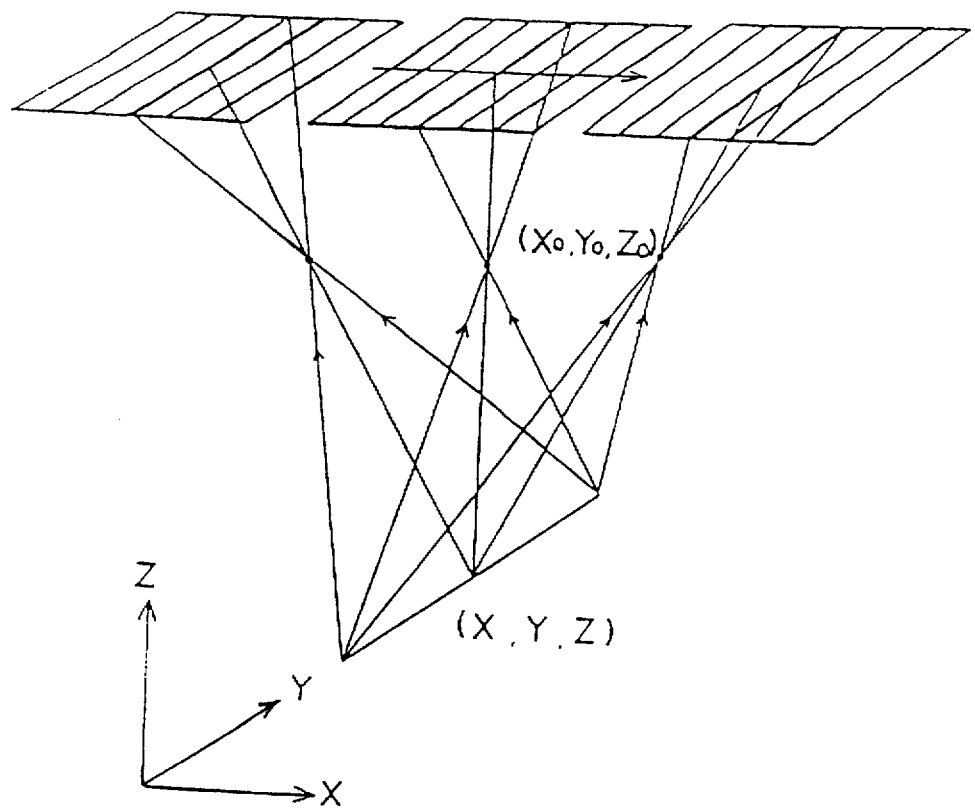
FIG. 2 shows how the airborne three-line sensor camera works.

FIG. 2 illustrates how the three-line sensor system used in the present invention works.

As seen from FIG. 2, three different corresponding points ($x_i, y_i, z_i$: i=1, 2 or 3) are formed on three digital land images respectively.

The instantaneous sensor position is given by ($X_{0i}$, $Y_{0i}$, $Z_{0i}$), and the different inclinations are given by ($\omega_i$, $\phi_i$ and $u_i$).

One of the corresponding points (x, y) is given by the following equations:

$$x = -f \frac{a_1(X-X_0) + a_2(Y-Y_0) + a_3(Z-Z_0)}{a_7(X-X_0) + a_8(Y-Y_0) + a_9(Z-Z_0)}$$

$$y = -f \frac{a_4(X-X_0) + a_5(Y-Y_0) + a_6(Z-Z_0)}{a_7(X-X_0) + a_8(Y-Y_0) + a_9(Z-Z_0)}$$

, where f stands for focal length.

These equations can be converted as follows:

$$\begin{cases} X - uZ = x_0 - uz_0 \\ Y - vZ = y_0 - vz_0 \end{cases},$$

where $$u = \frac{a_1x + a_4y - a_7f}{a_3x + a_6y - a_9f}, \text{ and } v = \frac{a_2x + a_5y - a_8f}{a_3x + a_6y - a_9f}$$

$a_1, \dots, a_9$ are given by the following rotational matrixes.

$$\begin{pmatrix} a_1 & a_2 & a_3 \\ a_4 & a_5 & a_6 \\ a_7 & a_8 & a_9 \end{pmatrix} =$$

$$\begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} \cos u & -\sin u & 0 \\ \sin u & \cos u & 0 \\ 0 & 0 & 1 \end{pmatrix},$$

where $u = \begin{cases} +d & \text{distance from the center to the backward-oblique sensor} \\ 0 & \text{distance from the center to the vertical sensor} \\ -d & \text{distance from the center to the forward-oblique sensor} \end{cases}$ d: distane from the center of the arranged sensor The above two equations are held for each corresponding point, and the three-dimensional coordinates (X, Y, Z) in the land surface can be determined from six equations in total according to the method of least squares.

Figure 3:
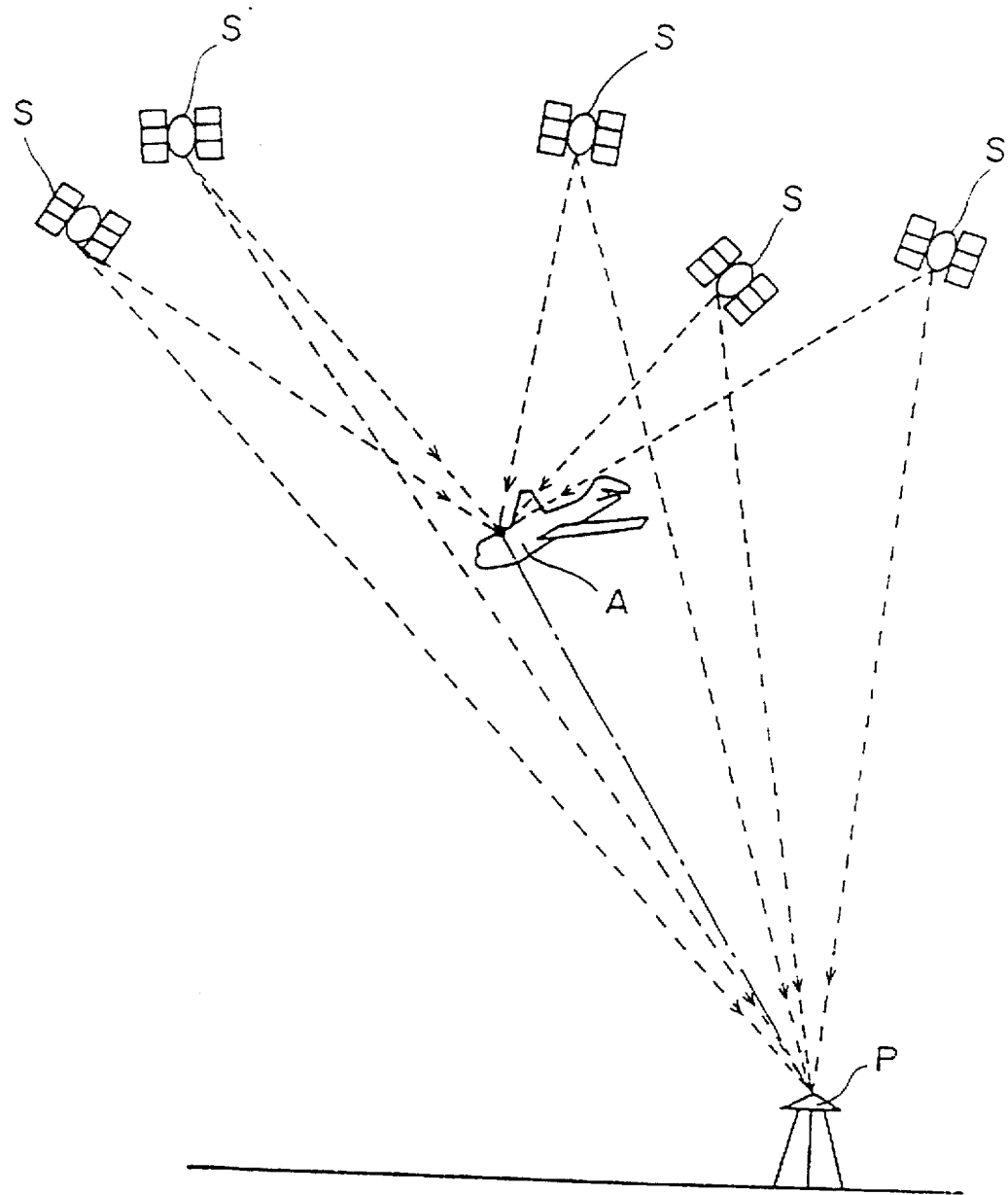
FIG. 3 shows how the GPS determines the instantaneous position of the airplane.

FIG. 3 shows how the GPS works in determining the instantaneous position of the camera.

As seen from FIG. 3, the airplane or ship A bearing a GPS receives signals from four artificial satellites S selected among those flying in space, determining the distance to each artificial satellite. The instantaneous position of each artificial satellite is determined at the time of photographing by using the presumable orbit data of the artificial satellite S available from the stationary station P on the ground, and then, the receiving station (airplane A) is located on the surface of each sphere having a radius of the so determined distance from the stationary station P to the airplane A with its center on the artificial satellite. Such calculations are performed on four or more artificial satellites, and the receiving station (airplane A) is located continuously in the kinematic or differential mode.

A stabilizer 4 (FIG. 1) absorbes the vibration of the airplane, and at the same time it controls the attitude of the airborne camera.

Figure 4:
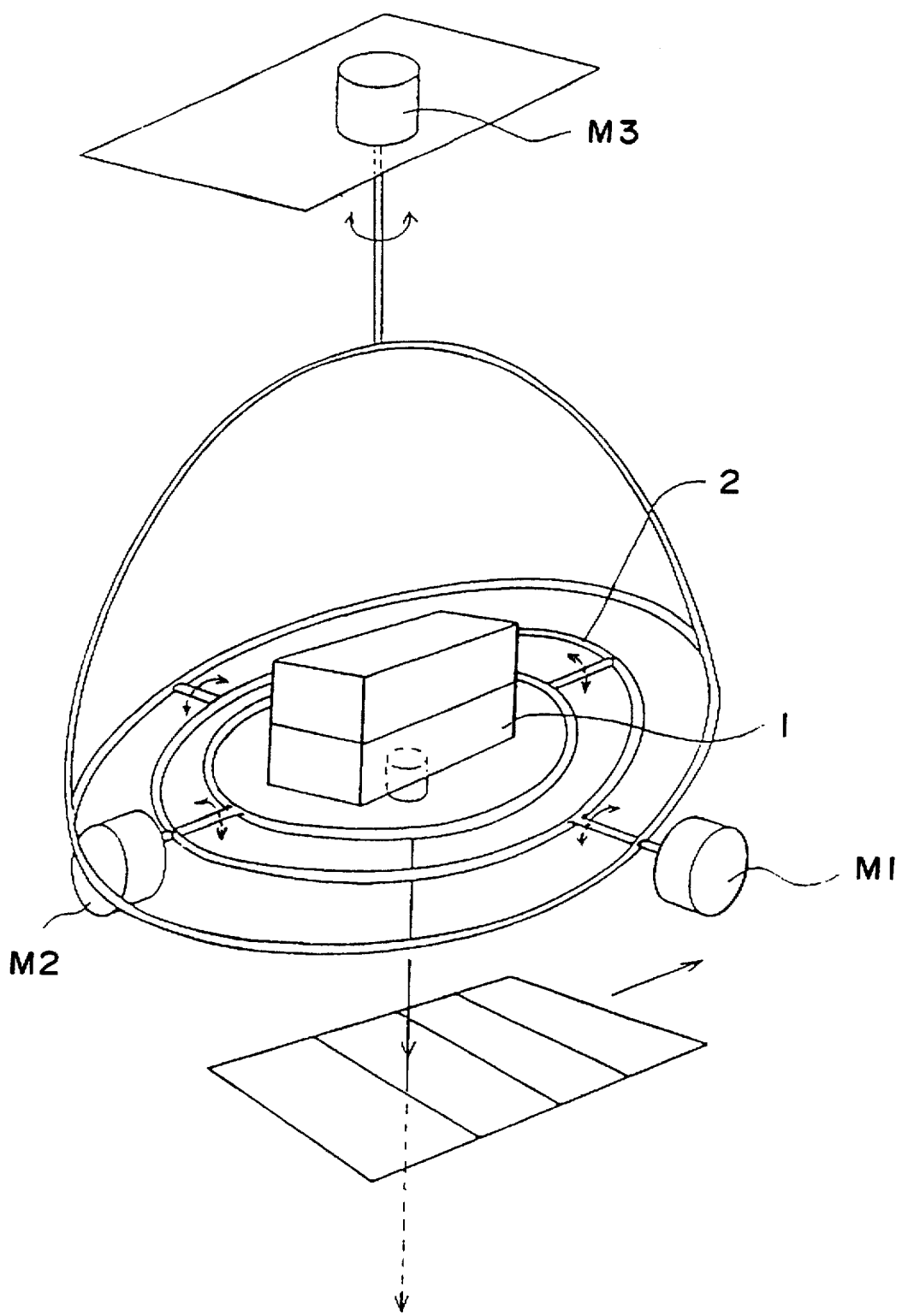
FIG. 4 shows the stabilizer and associated control.

FIG. 4 shows the controlling mechanism of the stabilizer. As shown in this drawing, the three-line sensor camera 1 has a gyro 2 integrally connected thereto, and the gyro 2 provides voltage signals to control the motors (M1, M2, M3) of the three-axis attitude control mechanism, thereby putting the camera in alignment with a given fixed direction.

FIGS. 5 to 8 show how the three-line sensor camera 1 photographs a piece of land.

Figure 5:
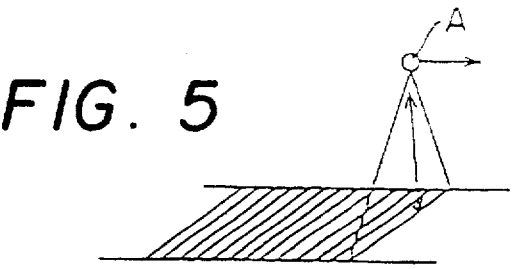
FIG. 5 shows how the three-line sensor camera takes a picture of a selected piece of land when the airplane is on the proper course with its attitude retained ideally.

Referring to FIG. 5, the airplane A is flying on a given course at a predetermined height and in a predetermined direction. In this ideal case the airborne three-line sensor camera 1 is directed vertically all the time, thus providing complete land images, which are free of distortions, and not losing any fraction of data.

Figure 6:
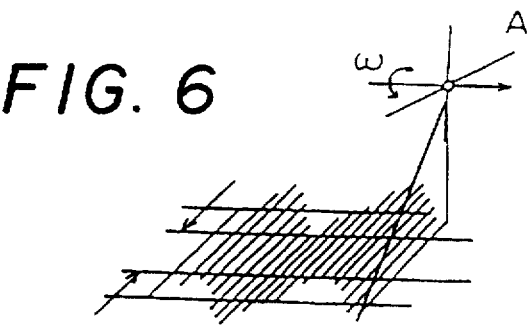
FIG. 6 shows how the three-line sensor camera takes a picture of a selected piece of land when the airplane is rolling.
Figure 7:
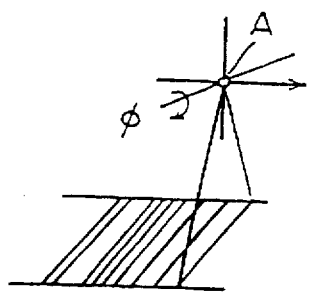
FIG. 7 shows how the three-line sensor camera takes a picture of a selected piece of land when the airplane is pitching.
Figure 8:
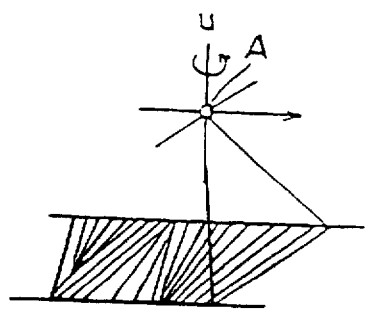
FIG. 8 shows how the three-line sensor camera takes a picture of a selected piece of land when the airplane is yawing.

It is, actually impossible, however, that the airplane will always fly on the ideal course, and it is liable to deviate from the proper course when being adversly affected by wind and other weather factors. FIG. 6 illustrates how the piece of land is swept when the airplane is rolling; FIG. 7 illustrates how the piece of land is swept when the airplane is pitching; and finally FIG. 8 illustrates how the piece of land is swept when the airplane is yawing.

It is, therefore, necessary that the three-axis attitude control mechanism be controlled in real time so as to hold the attitude of the airborne camera vertically at a fixed height, thus putting its sensors in condition in which they may traverse the proper flight course.

Assume that the attitude of the airplane is recorded while photographing in place of controlling the attitude of the airplane, thus allowing the airborne camera to scan out of the land-sweeping range when the airplane inclines to follow the correct flight course. In this case the reproduced land image will be incomplete, losing some fractions of land image data. Even though the airplane is on the correct flight course, the airborne camera when inclining about any of the three coordinate axes as shown in FIGS. 6 to 8, will fail to scan across the selected strip of land completely, and the reproduced image cannot be interpolated or extrapolated for providing a complete land image. Such interpolation or extrapolation, if possible, will take much time for computor processing.

Figure 9:
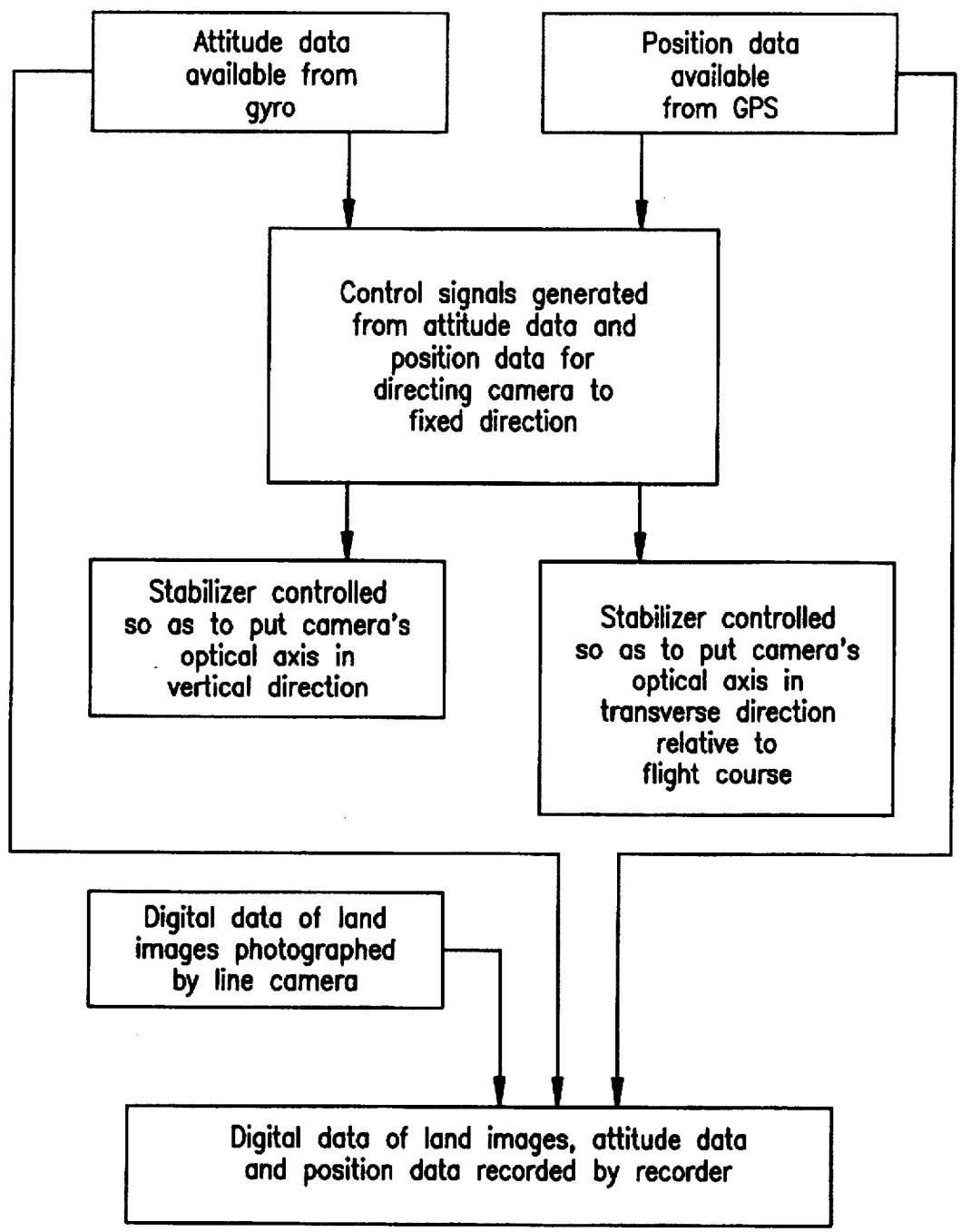
FIG. 9 is a flow chart according to which the data processing unit effects the processing of data.

FIG. 9 is a flowchart showing the processing of data carried out by an associated data processor.

As shown in FIG. 9, the data processor 5 effects the processing of attitude data from the gyro 2 and the instantaneous position data from the GPS 3 for outputting signals to control the stabilizer 4.

A decision as to whether or not the airplane is flying straight on the proper flight course can be made from the instantaneous position data from the GPS 3. Also, a decision as to whether or not the airplane should turn can be made from the data of yaw angle available from the gyro 2 (particularly such turn caused by a traversing wind). Accordingly a required correction can be made for directing the airborne camera to be transverse to the proper flight course (or making the airborne camera to scan transversly across the strip of land), which correction is called "drift-angle correction" or "yaw correction".

The data processor 5 transfers land image data from the camera 1, data of the attitude of the airplane from the gyro 2, and data of the instantaneous position of the airplane from the GPS 3 to the data recorder 6. From the data signals are produced to control the motors of the stabilizer for setting the optical axis of the airborne camera 1 to be vertical.

The data recorder 6 is a digital recorder which is capable of recording digital data at an increased rate, thus permitting the real-time recording of the land image data, which is transfered from the camera 1 to the data processor 5. At the same time, data of the attitude available from the gyro 2, and data of the instantaneous position available from the GPS 3 are recorded synchronously with each scanning line of the land image data.

The image display 7 shows the land image taken by the airborne camera 1 in real time, thereby permitting a decision as to whether or not the airplane is now on the proper flight course to be made.

The data analizer 8 on the ground makes required corrections of the lens aberration, CCD characteristics and other proper factors on the basis of land image data, the attitude data and the position data all recorded on the data recorder 6 to provide land image data in terms of fixed coordinates for each pixel. The land image data thus provided can be used in driving the software pertaining to the digital photogrametry.

As may be understood from the above, a three-line sensor camera photographs a selected piece of land continuously to provide land image data taken at three different angles, thereby permitting the analyzing of the land in terms of shape and height in real time. Also, attitude data is available from the gyro integrally connected to the camera, and the feed-back controlling of the camera is effected on the basis of the attitude data so as to direct the optical axis of the camera in the vertical direction as all times, and at the same time to direct the line sensors to transverse the flying course, thus assuring that the land image data is free of distortion. Thanks to this art line sensors which have been hitherto thought to be used only in stable artificial satellites can be on board for recording of digital land images.

In addition to land image data recorded in digital form the attitude data available from the gyro and the position data available from the GPS are recorded together.

Advantageously all these recorded data are used for processing photographs, thereby permitting the digital photomapping with precision at an increased efficiency, and no reference-point finding work is unnecessary.

What is claimed is:

1. An airborne photographing apparatus, comprising: an airborne three-line sensor camera for taking pictures of a selected piece of land in three directions, that is, forward obliquely, vertically and backward obliquely; a gyro mounted in the housing of the three-line sensor camera for determining the attitude of the camera while photographing; a GPS for providing the instantaneous position data of said camera in the three-dimensional space; a stabilizer for controlling the attitude of said camera to set its optical axis to be vertical at all times, and at the same time for absorbing vibrations of the aeroplane; a data processing unit for processing attitude data from said gyro and position data from said GPS and outputting signals for controlling said stabilizer; a data recorder for recording the land image data from said camera, the attitude data from said gyro and the position data from said GPS; an image display for showing the land image data from said camera; and a data analyzer for converting the land image data from said camera into the land image data given in terms of fixed coordinates on the basis of the land image data, attitude data and position data all recorded by said data recorder, and for outputting the so converted land image data.

* * * * *